Patented Aug. 28, 1951

2,566,268

UNITED STATES PATENT OFFICE 2,566,268

POLYMERIC ESTERS OF NATURAL DRYING
OIL FATTY ACIDS

Winston J. Wayne, Wilmington, Del., assignor to
E. I. du Pont de Nemours & Company, Wilmington, Del., a corporation of Delaware No Drawing. Application August 13, 1948,
Serial No. 44,222

6 Claims. (Cl. 260—410.6)

This invention relates to polymeric materials, and more particularly to polymeric esters useful for coating compositions.

It is an object of this invention to provide new polymeric esters. A further object is to provide new polymeric drying oil esters and methods for their preparation. Another object is to provide polymeric drying oil esters which have a relatively rapid drying rate to yield insoluble, tough and flexible protective coatings. Other objects will appear hereinafter.

These objects are accomplished by providing esters of acids having an ethylenically unsaturated aliphatic chain of at least 12 carbons, with linear polymeric alcohols having in the polymer chain divalent alkylene radicals of at least two linear carbons and having attached directly to the polymer chain a plurality of secondary alcoholic hydroxyl groups, the ratio of chain carbon atoms to alcoholic hydroxyl groups being from 3:1 to 12:1. These new polymeric esters are useful for protective finishes. The preferred products may be represented essentially by the empirical formula $(CH_2)_x(CHOR)_y$, disregarding the exact terminating groups, in which R is the acyl radical of a drying oil acid having an ethylenically unsaturated chain of at least 12 carbon atoms, and the ratio of $x$ to $y$ may vary from 2:1 to 11:1.

The drying oil esters of this invention can be prepared suitably by heating the drying oil acids with the polymeric alcohol. The polymeric alcohols that may be used include hydrolyzed ethylene/vinyl ester copolymers having a mole ratio of ethylene to vinyl ester of between 1:2 and 5:1. The preparation and properties of these polymers have been described in U. S. 2,386,347, wherein ethylene is shown to polymerize with a vinyl ester, such as vinyl acetate, at temperatures of about 100° C. or less and under superatmospheric ethylene pressure in the presence of a suitable polymerization catalyst, such as a peroxygen compound. The ratio of ethylene to vinyl ester in such copolymers can be varied by varying the ethylene pressure; the higher the ethylene pressure, the higher the ratio of ethylene in the resulting copolymer. These copolymers are readily hydrolyzed, e. g., by dissolving the ethylene-vinyl ester copolymer in methanol or a mixture of an alcohol and toluene and treating with a hydrolyzing agent, such as an alkali or mineral acid. Such polymeric alcohols useful in the preparation of esters of this invention have substantially the empirical formula $(CH_2CH_2)_a(CH_2CHOH)_b$, wherein the ratio of $a$ to $b$ may vary from 1:2 to 5:1.

Similarly useful are polymeric alcohols obtained by the reduction of ethylene/carbon monoxide copolymers, as described in Scott S. N. 552,390, filed September 1, 1944, now U. S. Patent No. 2,495,292. The ethylene/carbon monoxide copolymers are obtained by subjecting the ethylene/carbon monoxide mixture at superatmospheric pressure, e. g., 250–700 atmospheres in the presence of a peroxygen catalyst to temperatures of for example 70–100° C. The resulting ethylene/carbon monoxide copolymer can be converted to polyhydric alcohols by reaction with hydrogen under pressures of 1000 to 15,000 lbs./sq. in. in the presence of a hydrogenation catalyst such as ruthenium dioxide and chromites of copper, zinc and nickel. The polyalcohols obtained by the latter process, which are useful as source materials for the manufacture of the drying oil acid esters of this invention, are those having essentially the empirical formula

$(CH_2CH_2)_c(CHOH)_d$ wherein the ratio of $c$ to $d$ may vary from 1:1 to 11:2. Thus the ratio of carbon atoms to hydroxyl groups is from 3:1 to 12:1.

Suitable drying oil acids that may be used include the acids which have at least 12 carbons and usually not more than 22 carbons and an ethylenic unsaturation, such as linoleic, linolenic, clupanodonic and soy-bean oil acids and mixtures of such acids or of China-wood oil with such acids. The esters are readily prepared by heating the acid and polymeric alcohol under esterification conditions.

The following examples, in which the parts given are by weight, further illustrate the practice of this invention.

Example I

Sixty parts by weight of a hydrogenated ethylene/carbon monoxide copolymer having a hydroxy number of 281, molecular weight of 1927, and a carbon/hydroxyl ratio of 12/1 was mixed with a stoichiometrically equivalent weight (82.5 parts) of linseed oil fatty acids and 10 parts of xylene in a round-bottomed 3-necked flask provided with a nitrogen inlet, thermometer, mechanical mercury-seal stirrer, and a condenser to separate refluxing xylene and water so as to allow the water to be drawn off while the xylene is returned to the reaction mixture. The mixture was blanketed with nitrogen and stirred and heated at 200–210° C. for 21 hours, when its acid number was 20. (The esterification was nearly as rapid as that of glycerol and linseed oil acids under the same conditions.) The product was a clear, brown, oily liquid. Its viscosity was 15.25 poises (25° C.) but the viscosity of a 75% solution in toluene was only 0.75 poises. A film of this oil to which cobalt drier (0.03% cobalt) had been added air-dried much faster than a corresponding film of linseed oil and after drying was harder, tougher, and less tacky than the linseed oil film.

*Example II*

A total of 159 parts of hydrogenated ethylene/carbon monoxide copolymer having a carbon to hydroxyl ratio of 9.7:1 was stirred under nitrogen atmosphere at 200° C. with 287 parts of linseed oil fatty acids and 85 parts of xylene. After reacting for 14 hours, the acid number was 28.4. The product was a clear, oily liquid having a Gardner-Holdt viscosity of 10.7 poises and a color number of 8. When 0.03% cobalt (as the naphthenate drier) was added to the oil, the film set up within 3 hours to a colorless, clear, smooth film. In contrast to this, linseed oil did not set up until approximately 7 hours had elapsed. Furthermore, the linseed oil film was inferior in properties to the film of this example after drying and after 4 months' outdoor exposure.

*Example III*

A total of 109.5 parts of a hydrogenated ethylene/carbon monoxide copolymer having a hydroxyl number of 512 and a carbon to hydroxyl ratio of 6.45:1 was reacted with 287 parts of linseed oil fatty acids in the presence of xylene, as described in Example II. The product had an acid number of 24, a Gardner-Holdt viscosity of 17.6 poises, and a color of 10. With cobalt drier, films air-dried within 2½ hours to a slightly tacky finish. The drying rate of this oil was faster than for an orthodox linseed oil-modified glyceryl phthalate. Outdoor exposure tests indicated the finish to be superior to heat-bodied linseed oil finishes.

*Example IV*

Three equivalents (328.5 parts) of a hydrogenated ethylene/carbon monoxide copolymer of hydroxyl number 513 and carbon to hydroxyl ratio of 6.25:1 was esterified in the presence of xylene with one equivalent (287 parts) of linseed oil acids at 200° C. To this product, which had an acid number of 6, was added ½ equivalent (37 parts) of phthalic anhydride and the mixture heated at 200° C. to give a product having an acid number of 4.7. The viscous, clear, brown liquid air-dried substantially tack-free in 4½ hours with added cobalt drier. The films were glossy, colorless, flexible, and tough. They had good water resistance but were sensitive to caustic soda.

In contrast to the above product, when twice the amount of phthalic anhydride was employed the reaction mixture gelled.

*Example V*

A substantially completely hydrolyzed ethylene/vinyl acetate copolymer (156 parts) having a carbon to hydroxyl ratio of 10:1 was heated at 200° C. for 14 hours with 287 parts of linseed oil acids and 100 parts of xylene. The product was a viscous liquid having an acid number of 28, a viscosity of 34 poises and a color number of 7. A portion of this oil was treated with 0.03% cobalt as the naphthenate and employed in the production of films. The films dried tack-free within 3½ hours and were superior to linseed oil in freedom from tack, hardness, print resistance, and similiar properties.

*Example VI*

Equivalent weights of a hydrolyzed ethylene/vinyl acetate copolymer having an ethylene/vinyl acetate ratio of 2.7:1 and a carbon to hydroxyl ratio of 7.4:1 (119.6 parts) and linseed oil acids (287 parts) were heated with 85 parts of xylene at 200° C. under nitrogen for 21 hours. The product had an acid number of 22 and a viscosity of 148 poises. Films prepared from this product were superior to those from linseed oil in freedom from tack, mar resistance, and hardness, and dried tack-free within 2 hours compared with 4½ hours for a linseed oil-modified glyceryl phthalate alkyd resin.

*Example VII*

A total of 100 parts of a hydrolyzed ethylene/vinyl acetate copolymer prepared from an ethylene/vinyl acetate copolymer of mole ratio 1.4:1 by hydrolyzing 85% of the ester groups, was heated for 19 hours at 200° C. with 308 parts of linseed oil acids. The product had an acid number of 37 and was a clear, amber, viscous oil. Films prepared from this oil dried rapidly and were superior in toughness and mar resistance to corresponding linseed oil films.

The polymeric alcohols particularly useful to make the acid esters of this invention are represented essentially by the empirical formula $(CH_2)_x(CHOH)_y$, without regard to the exact terminating groups of the polymers, where the ratio of $x$ and $y$ may vary from 2:1 to 11:1. Optimum properties of solubility and reactivity are obtained when lower molecular weight polyalcohols, e. g., having a molecular weight of from about 350–5000 are employed. When the ratio of carbon to hydroxyl is high, e. g., 16: difficulty is experienced in obtaining homogeneous solutions of the hydroxylated polymer and of the ester and the testers form soft, unattractive films. When the ratio of carbon to hydroxyl is low, e. g., 2:1 as in polyvinyl alcohol, the polymeric alcohol is insoluble in conventional solvents and the polyesters are difficult or impossible to prepare and use.

Although the hydroxyl-containing ethylene copolymers described above are generally more available than reduced propylene or butylene/carbon monoxide copolymers or the corresponding hydrolyzed propylene or butylene/vinyl ester copolymers, the latter types are also useful for the preparation of the esters of this invention. The alcoholic polymers useful in this invention include the hydroxyl-containing copolymers, derivable by the hydrogenation of a carbon monoxide copolymer or hydrolysis of a vinyl ester copolymer with a polymerizable 2 to 4 carbon monoolefin, e. g., ethylene, propylene, and isobutylene, or mixtures thereof. Thus, the polymeric alcohols of substantially the empirical formula

where R' and R'' are hydrogen or methyl and the ratio of $a$ to $b$ is from 1:1 to 2:1 and the ratio of $a+b$ to $c$ is from 2:1 to 11:1, are preferable.

Hydrolyzed ethylene/vinyl esters which have 80% or more of the original ester groups hydrolyzed (i. e., which may contain up to 20% of the initial ester groups) and hydrogenated ethylene/carbon monoxide copolymers which contain up to 20% of the original C=O groups, can be esterified with drying oil fatty acids to give drying oil esters of superior properties.

The esters of this invention can be prepared by any of the conventional ester-forming techniques, e. g., by direct esterification of the acids with the polymeric alcohol or by reaction of the acid chlorides with the alcohol. In view of economy, ease of control of reaction, and superiority of the product obtained, direct esterification of the acids with the polymeric alcohol is particularly desirable. Generally, direct esterification is effected by heating a mixture of the drying oil acids and the polymeric alcohol at temperatures of 100-250° C. with provisions for removing water formed in the reaction. At higher temperatures decomposition reactions may occur and lower the quality of the ester formed, while excessive reaction times may be required at temperatures below 100° C. The time required for the esterification is not critical and may vary over a wide range. The time is dependent upon the temperature, with higher temperatures generally requiring less time. Esterification catalysts may be added to accelerate the reaction or permit use of lower temperatures.

Solvents are useful in the preparation of the esters as well as for the application of the esters in the form of films or coatings. Any non-reactive solvent may be employed, e. g., xylene, toluene, benzene, dioxane, aliphatic hydrocarbons, or mixtures of such solvents. The aromatic hydrocarbons are particularly suitable in view of their availability, solvent properties, and ease of removal from the ester, particularly in the preparation of films. Any proportion of solvent which permits the reaction to proceed at a reasonable rate is satifactory; e. g., 10–100% of the solvent, based on the weight of the acids and polymeric alcohol, may be present. Minor amounts e. g., 25% by weight based on the total weight of the polyhydric alcohols, of other polyhydric alcohols, such as pentaerythritol or glycerine may also be present during the esterification of the unsaturated acids with the polymeric alcohols.

Drying oil fatty acids and the polymeric alcohol are generally present in the reaction mixture in stoichiometric weight ratios; i. e., the number of carboxylic acid groups is equal to the number of alcoholic hydroxyl groups. A minor proportion of the unsaturated fatty oil acids may be replaced by dibasic acids. In general, when a dibasic acid such as phthalic acid, or anhydride, is employed in amounts substantially over 25% of the total of the acids, crosslinkage is fairly rapid with resultant insolubilization during preparation of the ester. For optimum properties of the ester at least 75% of the alcoholic hydroxyl groups should be esterified with drying oil acids.

The products of this invention are useful in the preparation of coatings and protective finishes, fast-drying lithographic oils and varnishes, printing inks, linoxyn-like products, and the like. Pigments, dyes, and like materials commonly used in formulating finishes can be used in conjunction with the polymeric materials of this invention.

As many apparently widely different embodiments of this invention may be made without departing from the spirit and scope thereof, it is to be understood that the invention is not limited to the specific embodiments thereof except as defined in the appended claims.

I claim:

1. A poylmeric ester of a natural drying oil fatty acid and a linear polymeric alcohol having a molecular weight of 350 to 5000 and the emperical formula $$(CH_2)_a(CR'R'')_b(CHOH)_c$$

where R' and R'' are members of the group consisting of hydrogen and methyl, the ratio of $a$ to $b$ is from 1:1 to 2:1 and the ratio of $a+b$ to $c$ is from 2:1 to 11:1, said linear polymeric alcohol having each of the hydroxyl groups attached directly to a carbon atom of the linear polymer chain.

2. A polymeric ester of the linseed oil fatty acids and a linear polymeric alcohol having a molecular weight of 350 to 5000 and the empirical formula $(CH_2)_a(CR'R'')_b(CHOH)_c$ where R' and R'' are members of the group consisting of hydrogen and methyl, the ratio of $a$ to $b$ is from 1:1 to 2:1 and the ratio of $a+b$ to $c$ is from 2:1 to 11:1, said linear polymeric alcohol having each of the hydroxyl groups attached directly to a carbon atom of the linear polymer chain.

3. A polymeric ester of a natural drying oil fatty acid and a linear polymeric alcohol having a molecular weight of 350 to 5000 and the empirical formula $(CH_2)_x(CHOH)_y$ wherein the ratio of $x$ to $y$ is from 2:1 to 11:1, said linear polymeric alcohol having each of the hydroxyl groups attached directly to a carbon atom of the linear polymer chain.

4. A polymeric ester of the linseed oil fatty acids and a linear polymeric alcohol having a molecular weight of 350 to 5000 and the empirical formula $(CH_2)_x(CHOH)_y$ wherein the ratio of $x$ to $y$ is from 2:1 to 11:1, said linear polymeric alcohol having each of the hydroxyl groups attached directly to a carbon atom of the linear polymer chain.

5. A polymeric ester of a natural drying oil fatty acid and a linear polymeric alcohol having a molecular weight of 350 to 5000 and consisting of a hydrogenated copolymer of ethylene with carbon monoxide wherein the ratio of carbon atoms to hydroxyl groups is from 3:1 to 12:1, said linear polymeric alcohol having each of the hydroxyl groups attached directly to a carbon atom of the linear polymer chain.

6. A polymeric ester of linseed oil fatty acids and a linear polymeric alcohol having a molecular weight of 350 to 5000 and consisting of a hydrogenated copolymer of ethylene with carbon monoxide wherein the ratio of carbon atoms to hydroxyl groups is from 3:1 to 12:1, said linear polymeric alcohol having each of the hydroxyl groups attached directly to a carbon atom of the linear polymer chain.

WINSTON J. WAYNE.

REFERENCES CITED

The following references are of record in the file of this patent:

UNITED STATES PATENTS

| Number | Name | Date |
|---|---|---|
| 2,386,347 | Roland | Oct. 9, 1945 |
| 2,449,956 | Shokal | Sept. 21, 1948 |

FOREIGN PATENTS

| Number | Country | Date |
|---|---|---|
| 419,604 | Great Britain | 1934 |